United States Patent
Qian et al.

(10) Patent No.: US 9,520,683 B2
(45) Date of Patent: Dec. 13, 2016

(54) CONNECTOR AND MANUFACTURING METHOD THEREOF

(71) Applicant: FOXCONN INTERCONNECT TECHNOLOGY LIMITED, Grand Cayman (KY)

(72) Inventors: Qiu Qian, Kunshan (CN); Jian-Kuang Zhu, Kunshan (CN); Huo-Xing Jin, NanChang (CN); Chun-Sheng Li, Kunshan (CN); Wen-Fang Zhang, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/826,168

(22) Filed: Aug. 13, 2015

(65) Prior Publication Data

US 2016/0049752 A1    Feb. 18, 2016

(30) Foreign Application Priority Data

Aug. 14, 2014  (CN) .................... 2014 2 0458019 U
Nov. 28, 2014  (CN) ......................... 2014 1 0700515

(51) Int. Cl.
*H01R 9/03*    (2006.01)
*H01R 13/6585*  (2011.01)
(Continued)

(52) U.S. Cl.
CPC ..... *H01R 13/6585* (2013.01); *B29C 45/14467* (2013.01); *H01R 13/405* (2013.01);
(Continued)

(58) Field of Classification Search
CPC ............ H01R 13/6585; H01R 13/6586; H01R 13/6587; H01R 13/6581; H01R 13/6597; H01R 24/60; H01R 43/24; H01R 43/16; H01R 13/405; B29C 45/14467; B29L 2031/36
(Continued)

(56) References Cited

U.S. PATENT DOCUMENTS

2012/0214343 A1*  8/2012  Buck .................. H01R 13/6586
                                                    439/607.05
2014/0342607 A1*  11/2014  Wang ................. H01R 13/6587
                                                    439/607.05
(Continued)

FOREIGN PATENT DOCUMENTS

TW    M478940    5/2014
TW    M249282    11/2014
TW    M335851    11/2014

*Primary Examiner* — Jean F Duverne
(74) *Attorney, Agent, or Firm* — Wei Te Chung; Ming Chieh Chang

(57) ABSTRACT

An electrical connector and a manufacturing method thereof includes a housing made of plastic material and at least one terminal module fixed in the housing. The housing defines a mating portion extending along a front-to-rear direction and the mating portion defines at least one mating surface in a vertical direction. The terminal module includes a plurality of conductive terminals with contacting portions and an insulating block, the housing is injection molded with the terminal module to form the mating portion so that the contacting portions of the conductive terminals are exposed on the mating surface. It is simple to manufacture and conducive to reduce the manufacturing cost.

5 Claims, 12 Drawing Sheets

(51) Int. Cl.
  *H01R 13/405* (2006.01)
  *H01R 43/16* (2006.01)
  *B29C 45/14* (2006.01)
  *H01R 43/24* (2006.01)
  *B29L 31/36* (2006.01)

(52) U.S. Cl.
  CPC ............ *H01R 43/16* (2013.01); *H01R 43/24* (2013.01); *B29L 2031/36* (2013.01)

(58) Field of Classification Search
  USPC .................................................... 439/607.05
  See application file for complete search history.

(56) References Cited

U.S. PATENT DOCUMENTS

| | | | | |
|---|---|---|---|---|
| 2015/0126068 A1* | 5/2015 | Fang | ................. | H01R 13/6587 439/607.23 |
| 2015/0364871 A1* | 12/2015 | Lin | ................... | H01R 13/6581 439/607.58 |

* cited by examiner

CONNECTOR AND MANUFACTURING METHOD THEREOF

BACKGROUND OF THE INVENTION

1. Field of the Invention

The present invention relates to a connector and manufacturing method thereof, and particularly to a connector accessible to mating with a mating connector and a manufacturing method thereof. This invention relates to the copending application Ser. No. 14/531,978 filed Nov. 3, 2014 with the same applicant and the same assignee.

2. Description of Related Art

Taiwan Patent No. M478940 issued on May 21, 2014 discloses a connector accessible to mating with a mating connector. The connector includes an electrical member, two terminal module disposed in the electrical member, and an insulative housing injection molded into the electrical member. In the manufacturing process of the connector, it is preferred to respectively make the conductive member via a die-cast molding and the terminal modules via an insert/injection molding, and then assemble the terminal modules into the conductive member, and subsequently pour insulative material into the conductive member via another molding process to form the insulative housing so as to fix the conductive member and the terminal modules well.

However, the manufacturing process is somewhat complicated with many steps and also costs much.

Hence, a simplified connector and a manufacturing method thereof are implemented to remove the outer conductive member while keeping/expanding the housing to hold the inner terminal modules in position and provide the complete contour of the whole connector.

SUMMARY OF THE INVENTION

Accordingly, an object of the present invention is to provide a connector with low cost and a simple manufacturing method thereof.

In order to achieve the object set forth, a connector provided, which comprises an insulative housing including a mating portion extending along a front-to-rear direction, and the mating portion defining at least one mating surface at two opposite sides thereof in a vertical direction perpendicular to the front-to-rear direction; at least one terminal module defined in the housing and including a plurality of conductive terminals and an insulating block, and each conductive terminal defining a contacting portion; wherein the housing is directly injection molded with said at least one terminal module to form the mating portion, and wherein the contacting portions of said a plurality of conductive terminals are exposed on said at least one mating surface.

In order to achieve the object set forth, a manufacturing method of a connector provided, which comprises the steps of: providing two rows of conductive terminals, and injection molding an insulating block onto each row of conductive terminals to form two terminal modules, wherein each row of conductive terminals defines a plurality of contacting portions protruding from the corresponding insulating block; assembling the two terminal modules together; directly injection molding a housing onto the two terminal modules, wherein the housing defines a mating portion extending along a front-to-rear direction and including two opposite mating surfaces in a vertical direction perpendicular to the front-to-rear direction, and wherein said contacting portions of two rows of conductive terminals are respectively exposed on the two opposite mating surfaces of the housing.

Other objects, advantages and novel features of the invention will become more apparent from the following detailed description when taken in conjunction with the accompanying drawings.

DETAILED DESCRIPTION OF THE PREFERRED EMBODIMENT

The first embodiment in accordance with one aspect of the present invention is described below referring to FIGS. 1~8.

Referring to FIGS. 1~3 and 8, a connector assembly in accordance with one aspect of the present invention includes an electrical connector 100 and a cover 200 assembled therewith. The connector 100 can be used as a plug connector or a receptacle connector and a mating connector 300 is provided for mating therewith in a front-to-rear direction. It should be noted that the connector 100 in the present invention can be placed or mounted in all kinds of states including horizontally, vertically or aslope, although reference is made to the horizontal state to describe the connector 100 herein.

Figure 4:
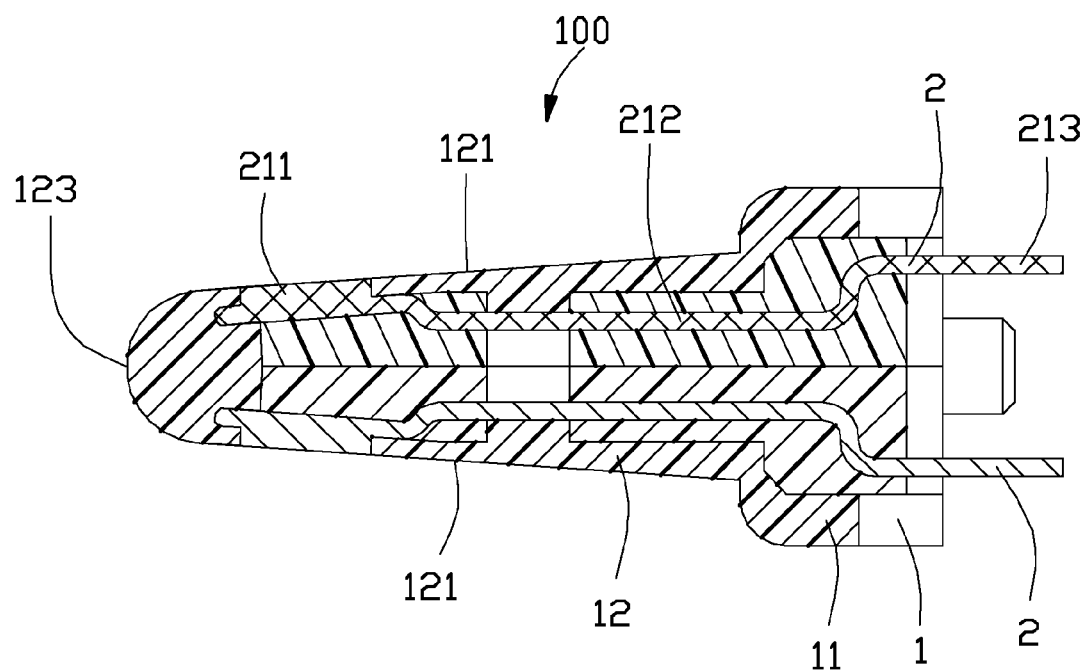
FIG. 4 is a cross-sectional view of the connector taken along line 4-4 shown in FIG. 3.
Figure 5:
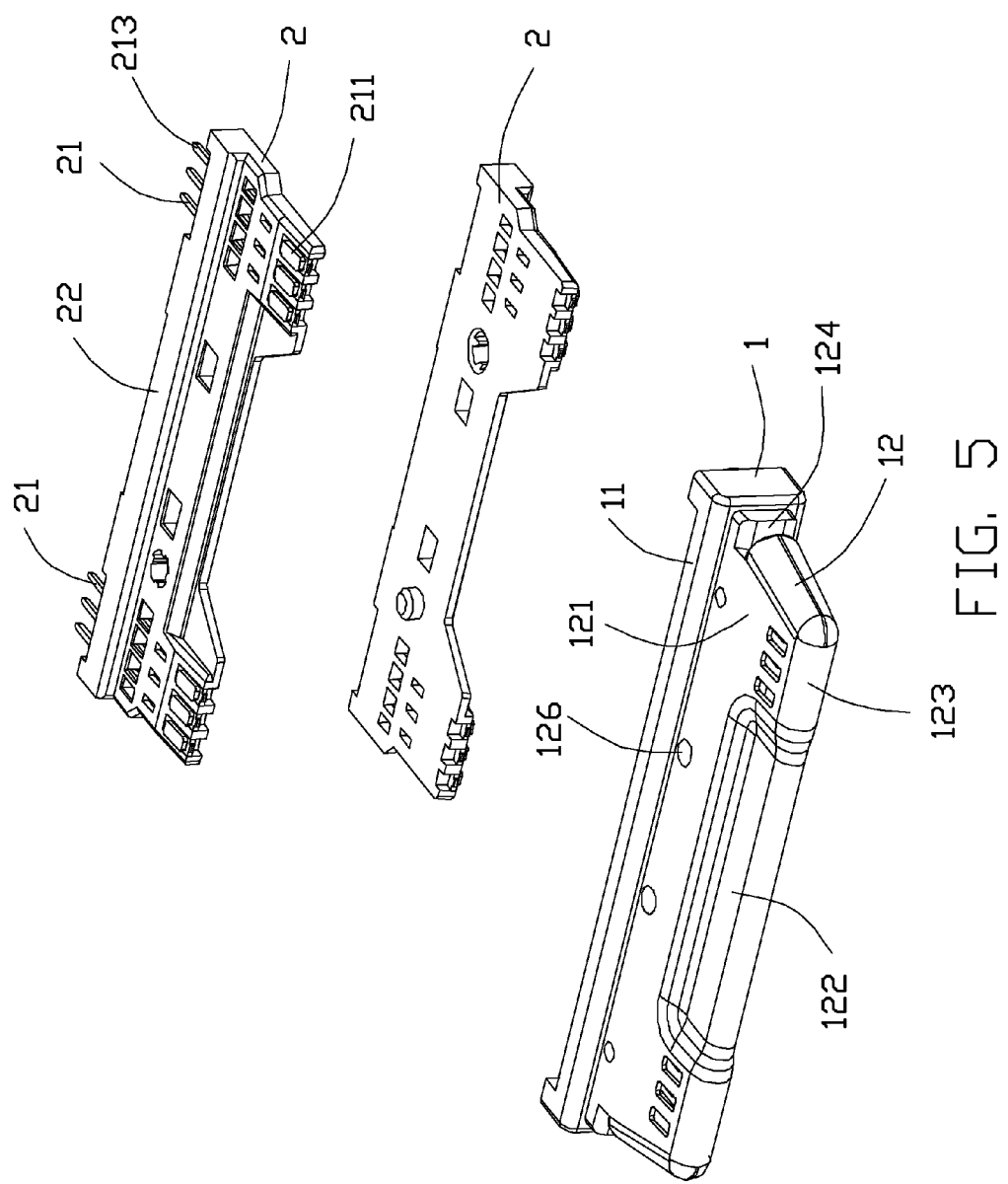
FIG. 5 is a partially exploded perspective view of the connector in FIG. 1.
Figure 6:
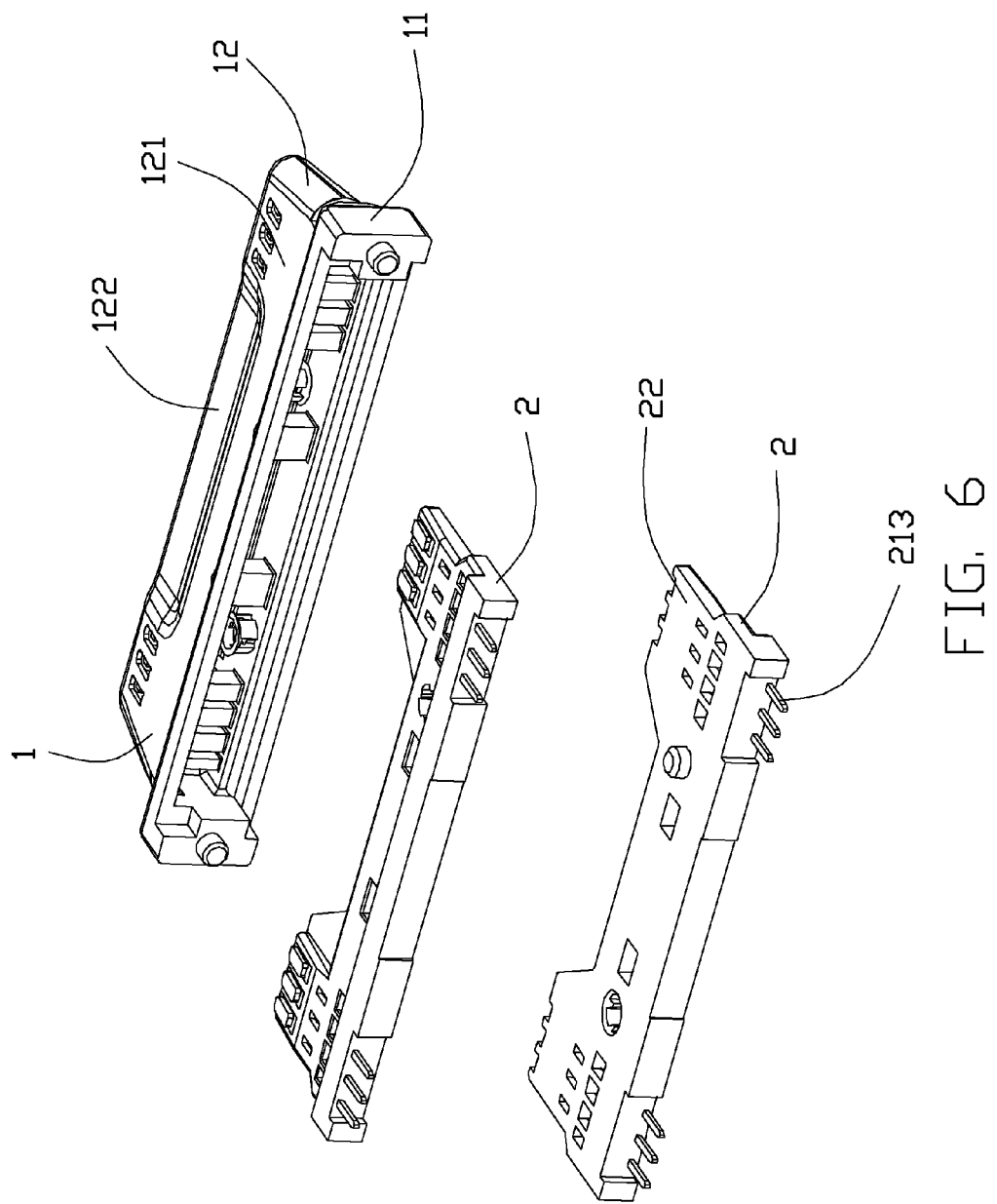
FIG. 6 is another perspective view of the connector in FIG. 5.
Figure 7:
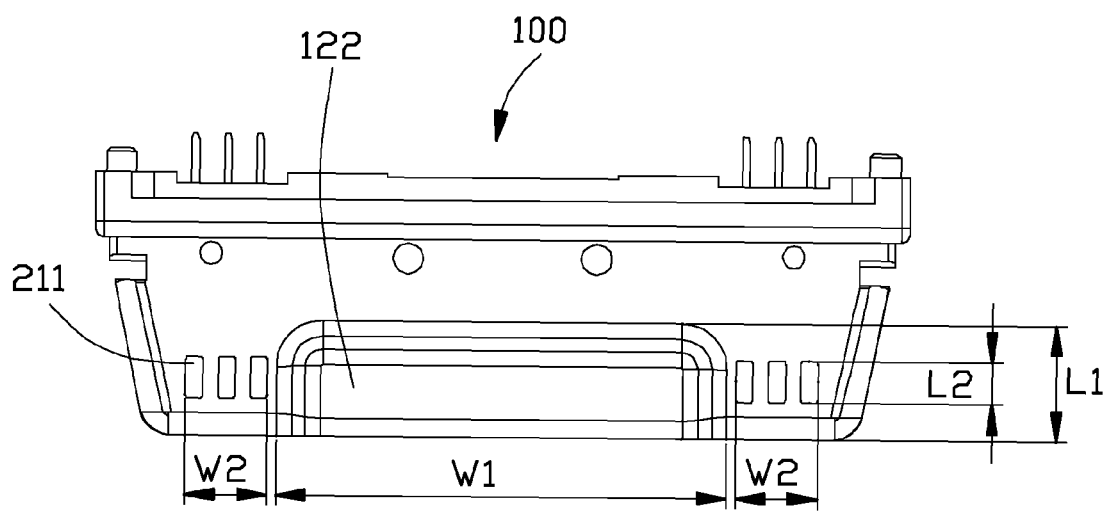
FIG. 7 is an aerial view of the connector in FIG. 1.
Figure 8:
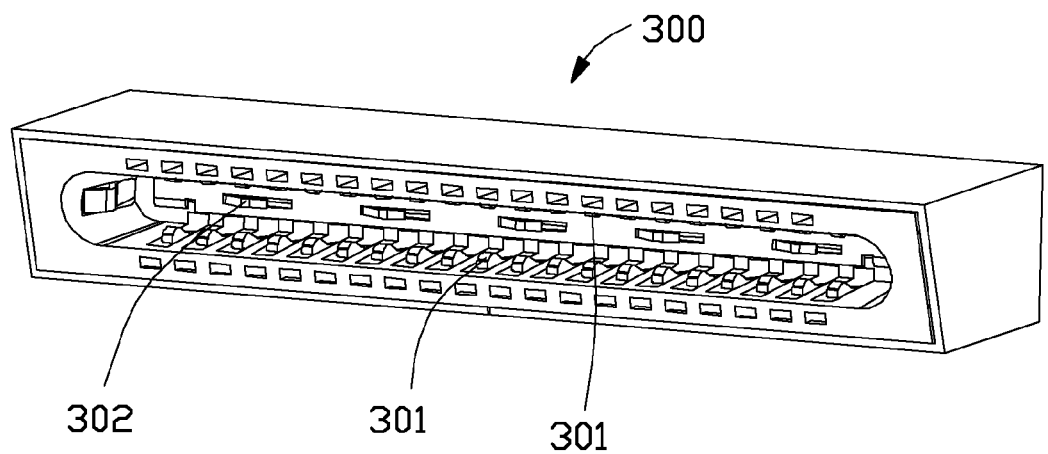
FIG. 8 is a mating connector able to mate with the connector in FIG. 1.
Figure 9:
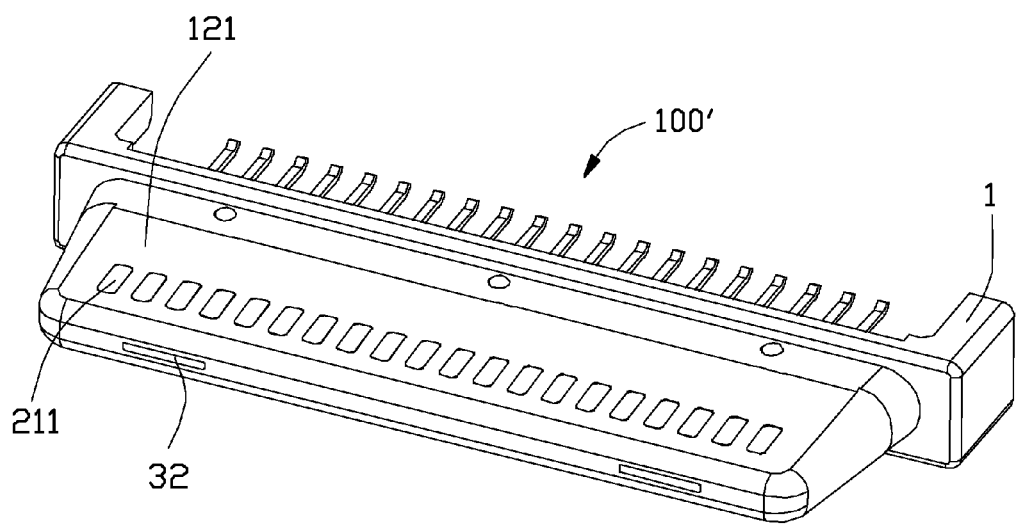
FIG. 9 is a perspective view of a connector according to the second embodiment of the present invention.
Figure 10:
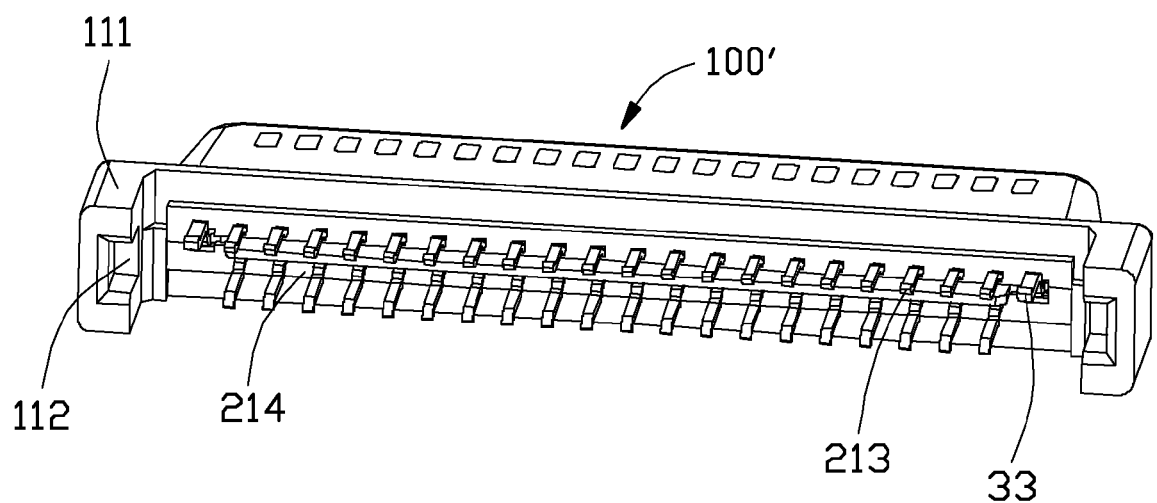
FIG. 10 is another perspective view of the connector in FIG. 9.
Figure 11:
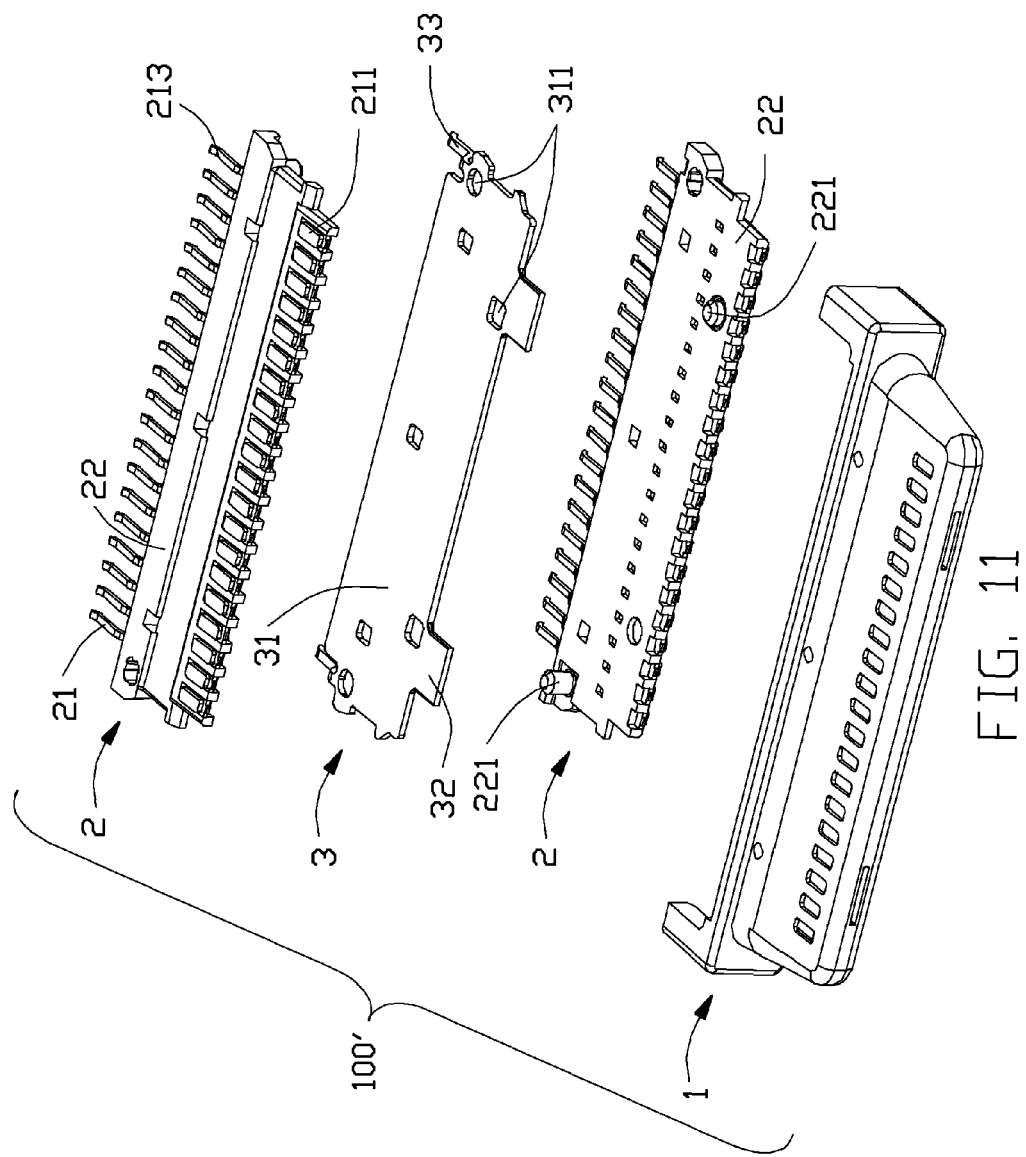
FIG. 11 is a partially exploded perspective view of the connector in FIG. 9.
Figure 12:
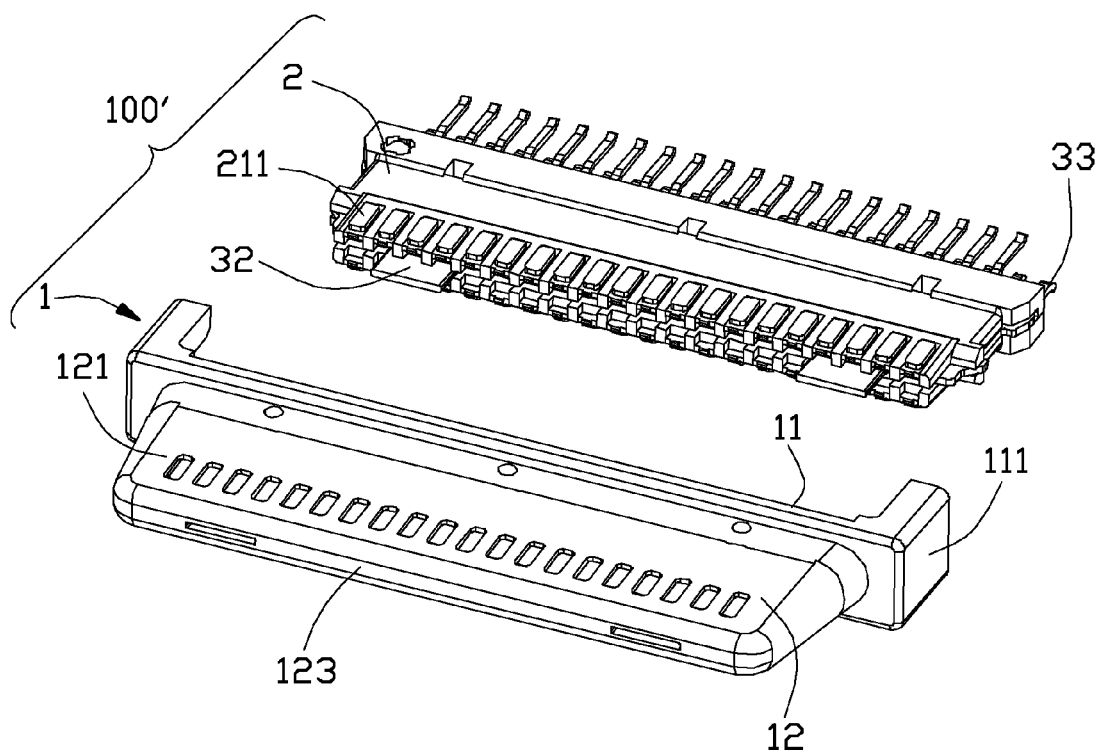
FIG. 12 is another partially exploded perspective view of the connector in FIG. 9.

Referring to FIGS. 4~6, the connector 100 comprises a housing 1, two terminal modules 2 set apart in a vertical direction and disposed therein. Each terminal module 2 includes a row of conductive terminals 21 and an insulating block 22 injection molded thereonto to position them well. The insulating block 22 is made of plastic material which may be LCP (Liquid Crystal Polymer) engineering plastics, PA (Polyamide) or other materials. The housing 1, made of plastic material, forming around the two terminal modules 2 by injection molding technology, includes a base 11, a mating portion 12 extending forwardly from a front end thereof. Further, the mating portion 12 extends along a left-to-right direction and forms a longitudinal structure. It is to be noted that there is no metal member covering the housing 1. The mating portion 12 defines two mating surfaces 121 respectively disposed at two opposite sides thereof in the vertical direction and a front surface 123 disposed at a front end thereof. Each mating surface 121 defines a concave part 122 disposed in the middle thereof along the left-to-right direction and depressing inwardly or toward the other mating surface 121 and passing through the front surface 123 forwardly. The mating portion 12 defines a plurality of through holes 126 disposed behind the concave part 122 and passing through the two opposite mating surfaces 121. Wherein, the through holes 126 are formed when the housing 1 is injection molded onto the two terminal modules 2. Further, the mating portion 12 defines a pair of inwardly depressing cutouts 124 respectively at two opposite sides thereof in the left-to-right direction and adjacent to the through holes 126 in the front-to-rear direction. Each row of the two rows of conductive terminals 21, having six conductive terminals 21, contains six contacting portions 211 exposed on the mating surface 121 and arranged in a line along the left-to-right direction, and six tail portions 213 extending backwardly out of the insulating block 22, and six connecting portions 212 respectively connecting the six contacting portion 211 and the six tail portions 213. It is noted that the contacting portion 211 forms a greater thickness than other portions. The two insulating blocks 22 are respectively injection molded onto the connecting portions 212 of the two rows of conductive terminals 21 while both the contacting portions 211 and the tail portions 213 protrude out of the insulating blocks 22. The outer surfaces of the contacting portions 211 of the conductive terminals 21 are coplanar with the mating surfaces 121 of the raised portion of the mating portion 12. It should be understood that the outer surfaces of the contacting portions 211 can protrude beyond the mating surfaces 121 in other embodiments of the present invention. The contacting portions 211 are divided into two groups, each group including three contacting portions 211, symmetrically disposed at the left and right outsides of the concave part 122, in a line with the concave part 122 along the left-to-right direction. Referring to FIG. 7, the length L1 of the concave part 122 in the front-to-rear direction is bigger than the length L2 of the contacting portions 211 in the front-to-rear direction. W1 is defined as the width of the concave part 122 in the left-to-right direction and W2 is defined as the width of the group of three contacting portions 211. The width W1 of the concave part 122 is bigger than the width 2×W2 of the two groups of contacting portions 211 symmetrically disposed at the left and right outsides of the concave part 122.

Referring to FIGS. 1~3 and 8, the mating connector 300 is provided for mating with the connector 100 in a front-to-rear direction. As the connector 100 in accordance with one aspect of the present invention defines fewer conductive terminals 21 and differently the mating connector 300 defines more mating terminals 301, the conductive terminals 21 only engage electrically with some of the mating terminals 301 to meet a specific need of electric transmission such as only power transmission in the first embodiment. Accordingly, the connector 100 has not only met the specific need of electric transmission but also reduced significantly manufacturing costs. When the connector 100 is assembled with the mating connector 300, the concave parts 122 defined by the mating surfaces 122 will not contact or nib with the corresponding mating terminals 301, which can greatly reduce the insertion and extraction force needed to assemble or disassemble. That is to say, the concave parts 122 are defined by the mating surfaces 121 to greatly reduce the contacting or rubbing area between the mating surfaces 121 and the mating terminals 301 of the mating connector 300, which further greatly reduce the insertion and extraction force needed for the connector 100 and the mating connector 300 to assemble together or disassemble. As each concave part 122 passes through the front surface 123 forwardly, and the length L1 of each concave part 122 in the front-to-rear direction is bigger than the length L2 of each contacting portion 211, the mating terminals 301 of the mating connector 300 at the area corresponding to the concave parts 122 won't contact or rub with the mating surfaces 121 during the whole assembling process. Moreover, the wider the width W1 of the concave parts 122 is, the smaller the contacting or rubbing area between the mating surfaces 121 and the mating terminals 301 of the mating connector 300 is, and further the smaller the insertion and extraction force is.

Figure 1:
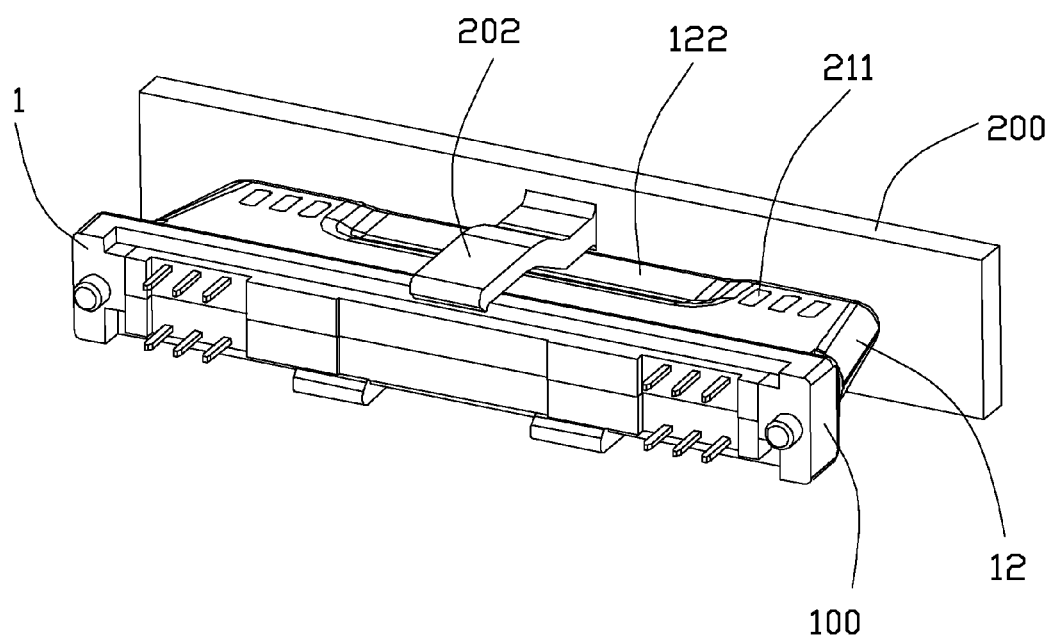
FIG. 1 is a perspective view of a connector assembly according to the first embodiment of the present invention.
Figure 2:
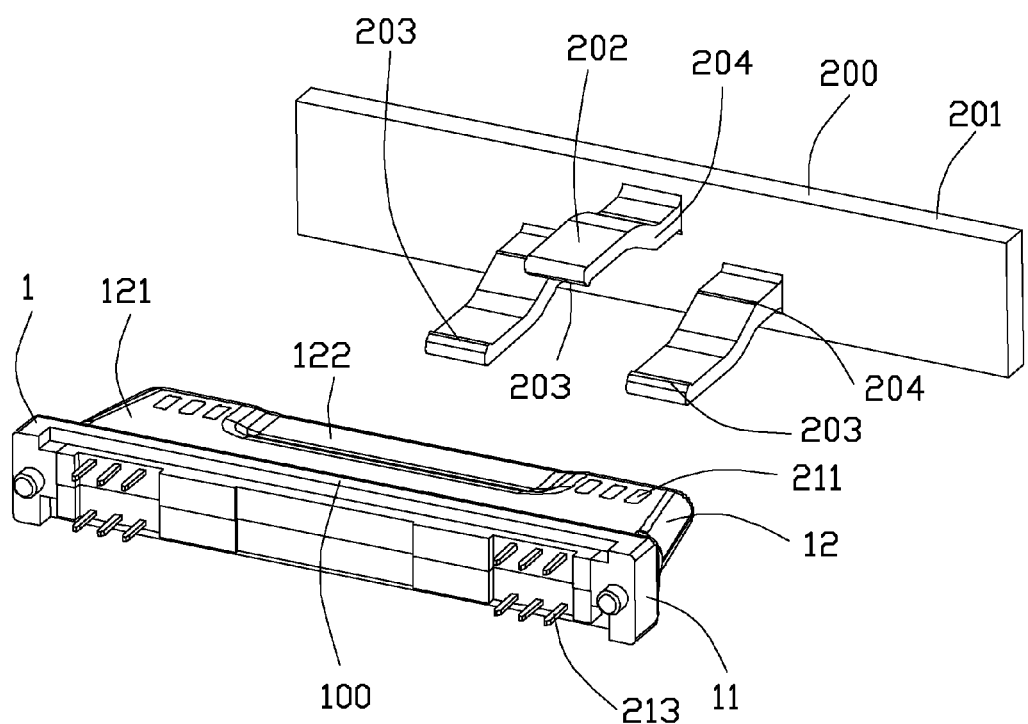
FIG. 2 is a partially exploded perspective view of the connector assembly in FIG. 1, and showing a connector disengaging with a cover.
Figure 3:
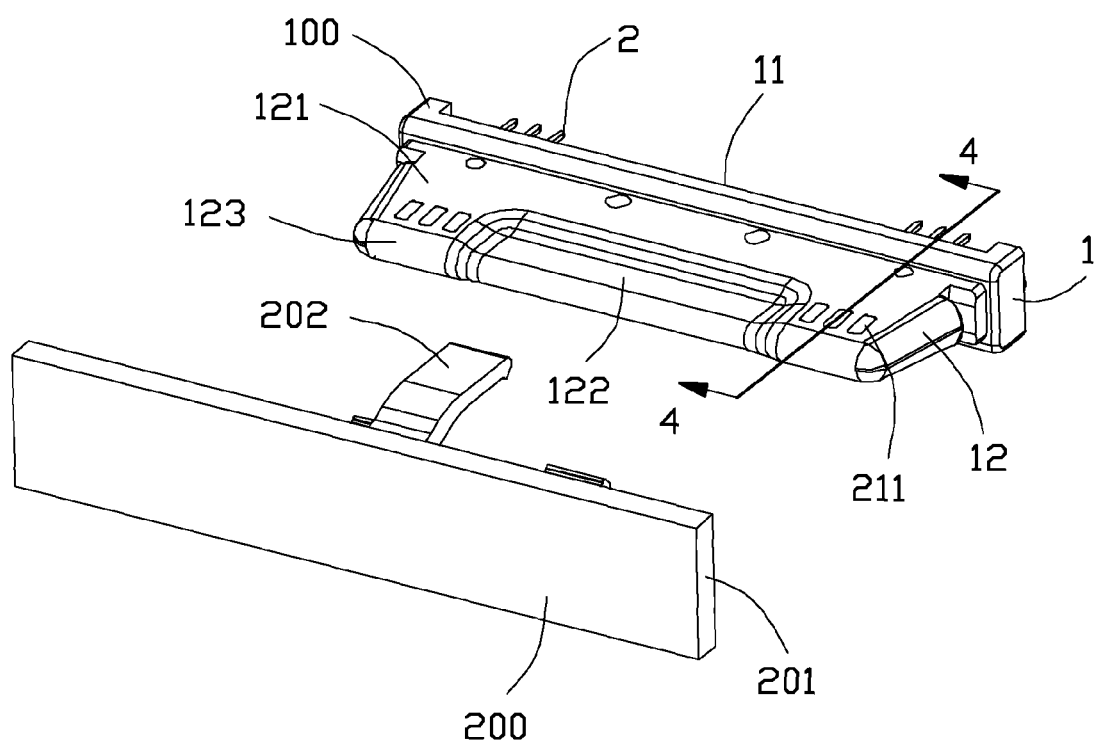
FIG. 3 is another perspective view of the connector assembly in FIG. 2.

Referring to FIGS. 1 and 2, the cover 200 is fixed to the connector 100 for a suction device (not shown) to pick up the connector 100 so as to facilitate movement and installation of the connector 100. The cover 200 provides a substrate 201 located in front of the mating portion 12 for the suction device (not shown) to pick up, and three locking portions 202 extending backwardly from the back of the substrate 201 so as to get hold of the connector 100 at two opposite sides thereof along the vertical direction where the concave parts 122 are disposed. Therefore, the locking portions 202 don't touch the contacting portions 211 of the conductive terminals 21. Wherein, every locking portion 202 defines a projecting inwardly locking barb 203 at the rear end thereof, each locking barb 203 holding the rear end of the base 11 of the housing 1. Further, every locking portion 202 defines a bending part 204 extending into and holding against the corresponding concave part 122. It is understood that defining the locking barbs 203 and the bending parts 204 is conducive to securing the cover 200 to the connector 100 well. In the first embodiment in accordance with one aspect of the present invention, the three locking portions 202 are distributed triangularly and there are two locking portions 202 and one locking portion 202 respectively holding against two opposite sides of the connector 100 in the vertical direction, wherein the one locking portion 202 being disposed in middle of the two locking portions 202 along the left-to-right direction, so as to secure the connector 100 into the three locking portions 202 well. Therefore, the three locking barbs 203 are also distributed triangularly, that is, the three locking barbs 203 are divided into two units, one unit including two locking barbs 203 and the other including one locking barb 203, which are respectively disposed up and down and face-to-face projecting from the rear ends of the locking portions 202. Further, the three locking barbs 203 are staggered along the left-to-right direction. Accordingly, the construction and arrangement of the locking portions 202 facilitate the molding process of the locking barbs 203.

Referring to the above description, the manufacturing method of the connector 100 contains following steps: providing two rows of conductive terminals 21, and injection molding an insulating block 22 onto each row of conductive terminals 21 to form two terminal modules 2, wherein each row of conductive terminals 21 defines contacting portions 211 protruding from the insulating block 22; assembling the two terminal modules 2 together; directly injection molding a housing 1 onto the two terminal modules 2, wherein the housing 1 defines a mating portion 12 with two opposite mating surfaces 121 in a vertical direction and extending along a front-to-rear direction, wherein the contacting portions 211 of each row of conductive terminals 21 protrude from the two opposite mating surfaces 121 of the housing 1.

The connector 100 is formed completely after the housing 1 is injection molded onto the two terminal modules 2 and without a metal member covering. The manufacturing method of the connector 100 is to reduce the amount of production steps so as to simplify the manufacturing process and further reduce the manufacturing costs of the connector 100.

All above is relative to the first embodiment of the present invention, while reference will now be made to FIGS. 9~12 to describe a second embodiment in accordance with a further aspect of the present invention. The second embodiment provides a connector 100' which is similar to the connector 100 and can also correspond with the mating connector 300. It is to be noted that the connector 100' uses the same numbers with the connector 100 to mark the structures similar to the connector 100 of the first embodiment, and some of said structures wouldn't be described in detail below.

Referring to FIGS. 9~12, different from the connector 100, the connector 100' further comprises a metal piece 3 and each terminal module 2 of the connector 100' defines more conductive terminals 21. Each terminal module 2 of the connector 100' includes a row of conductive terminals 21 arranged symmetrically in the left-to-right direction and an insulating block 22 injection molded thereonto, which is similar to the connector 100 of the first embodiment.

The metal piece 3 includes a shielding portion 31, a pair of engaging portions 32 respectively extending forwardly from two sides of the front end of the shielding portion 31, and a pair of grounding portions 33 extending backwardly from the rear end of the shielding portion 31. Mount and fix one side of the metal piece 3 on one of the two terminal modules 2 with a fixing hole 311 provided in the shielding portion 31 matching a fixing column 221 provided on the insulating block 22 of the terminal module 2, and then mount the other terminal module 2 on the other side of the metal piece 3, so as to make the metal piece 3 located between the two terminal modules 2. Wherein, the shielding portion 31 is located between two rows of contacting portions 211 of the conductive terminals 21, and the engaging portions 32 protrude forwardly out of the front ends of the contacting portions 211, and the grounding portions 33 extend backwardly out of the rear ends of the insulating blocks 22 of the two terminal modules 2.

A housing 1, made of plastic material, is injection molded onto both terminal modules 2, including a base 11 and a mating portion 12 extending forwardly from the front end of the base 11. Further, the mating portion 12 extends along a left-to-right direction and forms a longitudinal structure. That is, the connector 100' with the base 11 and the mating portion 12 is formed after the housing 1 is injection molded onto the two terminal modules 2. It is to be noted that there is no metal member covering the housing 1. The mating portion 12 defines two mating surfaces 121 respectively disposed at two opposite sides thereof in a vertical direction and a front surface 123 disposed at a front end thereof and no concave part on the mating surfaces 121. Each conductive terminal 21 defines a contacting portion 211 and a tail portion 213. The contacting portions 211 of a row of the conductive terminals 21 of each terminal module 2 are exposed on one of the two mating surface 121 and arranged equidistantly along the left-to-right direction, and the tail portions 213 thereof are arranged equidistantly in a line along the left-to-right direction. The engaging portions 32 of the metal piece 3 are exposed on the front surface 123 of the housing 1 and the two grounding portions 33 are disposed respectively at two ends of and in a line with one row of tail portions 213 of one terminal module 2.

The metal piece 3 is provided for reducing signal interference between two rows of conductive terminals 21 to improve the electrical performance of the connector 100'. The two engaging portions 32 of the metal piece 3 protrude out of the front surface 123 of the housing 1 and engage with the contact pieces 302 provided in the mating connector 300 when the connector 100' is assembled with the mating connector 300 together, which helps eliminate static electricity and further improve the electrical performance of the connector 100'.

The base 11 defines a pair of arms 111 respectively extending backwardly from two sides thereof in the left-to-right direction. A pair of mounting slots 112 are respectively defined at the opposite inner sides of the arms 12. The tail portions 213 of the two rows of conductive terminals 21 and the grounding portions 33 of the metal piece 3 are all between the two arms 111 in the left-to-right direction. Wherein, a receiving space 214 is formed between two rows of tail portions 213 arranged respectively up and down to clip a PCB (not shown), and the two mounting slots 112 are respectively located at two sides of the receiving space 214 in the left-to-right direction and facing the receiving space 214 so as to receive two sides of the PCB (not shown) to further fix the PCB (not shown) well.

The manufacturing method of the connector 100' which is similar to the connector 100 of the first embodiment contains the following steps: providing two rows of conductive terminals 21, and injection molding an insulating block 22 onto each row of conductive terminals 21 to form two terminal modules 2, wherein each row of conductive terminals 21 defines contacting portions 211 protruding from the insulating block 22; providing a metal piece 3 including a shielding portion 31 and a pair of grounding portions 33 extending from the shielding portion 31, and mounting the metal piece 3 on one of the terminal modules 2, and assembling the two terminal modules 2 together, wherein the shielding portion 31 is located between two rows of contacting portions 211 of the conductive terminals 21 of the two terminal module 2, and the grounding portions 33 extend out of the insulating blocks 22; directly injection molding a housing 1 onto the two terminal modules 2, and the housing 1 defines a mating portion 12 extending along a front-to-rear direction and with two opposite mating surfaces 121 in a vertical direction, and two rows of the contacting portions 211 of the two terminal modules 2 respectively protrude from the two opposite mating surfaces 121 of the housing 1.

The metal piece 3 of the connector 100 ' is not necessary, i.e., the connector 100' can be designed without the metal piece 3 so that the connector 100' can be manufactured in the same way with the connector 100. The base 11 and the mating portion 12 of the connector 100' are formed when the housing 1 is injection molded onto the two terminal modules 2 and there is no metal member covering the housing 1. The manufacturing method of the connector 100' is conducive to reducing the amount of production steps so as to simplify the manufacturing process and further reduce the manufacturing costs of the connector 100'.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector comprises:
an insulative housing including a mating portion extending along a front-to-rear direction, and the mating portion defining at least one mating surface locating at one of two opposite sides thereof in a vertical direction perpendicular to the front-to-rear direction; and
at least one terminal module disposed in the housing and including a plurality of conductive terminals and an insulating block, each conductive terminal defining a contacting portion;
wherein the housing is directly injection molded with said at least one terminal module to form the mating portion, and the contacting portions of said conductive terminals are exposed on said at least one mating surface wherein the connector defines two terminal modules separated in the vertical direction and received in the housing, and the mating portion defines a pair of said mating surfaces locating at two opposite sides thereof in the vertical direction, the contacting portions of the conductive terminals of said two terminal modules are respectively exposed on said mating surfaces; wherein the connector defines a metal piece locating between said two terminal modules, the metal piece includes a shielding portion and a grounding portion extending from the shielding portion, the shielding portion is disposed between the contacting portions of the conductive terminals of the terminal modules and the grounding portion extends beyond the insulating blocks; wherein the housing defines a front surface in the front thereof, the metal piece includes an engaging portion protruding forwardly from a front end of the shielding portion and beyond the front surface of the housing.

2. The electrical connector as claimed in claim 1, wherein the connector defines no metal member covering the housing.

3. The electrical connector as claimed in claim 1, wherein the insulating blocks are respectively injection molded onto said corresponding conductive terminals, and the housing includes a base injection molded onto the insulating blocks, the mating portion extending forwardly from said base in the front-to-rear direction.

4. A manufacturing method of a connector, comprising the steps of:
providing two rows of conductive terminals, and injection molding an insulating block onto each row of conductive terminals to form two terminal modules, wherein each row of conductive terminals defines a plurality of contacting portions protruding beyond the corresponding insulating block;
assembling the two terminal modules together;
directly injection molding a housing onto the two terminal modules, wherein the housing defines a mating portion extending along a front-to-rear direction and including two opposite mating surfaces in a vertical direction perpendicular to the front-to-rear direction, and wherein said contacting portions of two rows of conductive terminals are respectively exposed on the two opposite mating surfaces of the housing further providing a metal piece including a shielding portion and two grounding portions extending from the shielding portion, and mounting the metal piece onto one of the two terminal modules, then assembling the two terminal modules together, wherein the shielding portion is located between two rows of contacting portions of the two terminal modules and the grounding portions extend out of the insulating blocks; wherein the housing includes a base injection molded onto the insulating blocks of said terminal modules, the mating portion extends forwardly from a front end of the base, said two rows of conductive terminals define two rows of tail portions extending beyond the housing and spaced in the vertical direction to form a receiving space therebetween; wherein said two grounding portions are disposed respectively at two sides of and in a line with one row of the tail portions of one of the two terminal modules, the base defines a pair of arms respectively extending backwardly from two sides thereof in a left-to-right direction perpendicular to both the vertical and front-to-rear directions, the two arms define a pair of mounting slots respectively at two opposite sides thereof, said two rows of tail portions of said two terminal modules and said two grounding portions of the metal piece are all between the two arms, said a pair of mounting slots are respectively disposed at two sides of the receiving space in the left-to-right direction and facing the receiving space.

5. An electrical connector comprising:
a pair of terminal modules back to back assembled with each other in a vertical direction, each of said terminal modules including a plurality of contacts embedded within an insulator via a first insert molding process, each of said contacts including a front contacting section, a middle retention section and a rear tail section, said front contacting section having a raised portion with a greater thickness than the middle retention section and the rear tail section;
an insulative housing applied upon said pair of terminal modules via a second insert molding process, and defining a pair of mating surfaces obliquely opposite to each other, each of said mating surfaces being coplanar with outer surfaces of the raised portions of the corresponding contacting sections of the corresponding terminal module; wherein
the housing essentially fully encloses the insulators of said pair of terminal modules, and is fully exposed to an exterior vertically in said vertical direction and forwardly in a front-to-back direction perpendicular to said vertical direction wherein each insulator includes a first shoulder structure, and the housing forms a pair of second shoulder structures to compliantly enclose the corresponding first shoulder structures therein; wherein a metallic shielding plate is sandwiched between the pair of terminal modules in the vertical direction; wherein each terminal modules defines a cutout without contacts thereabouts, and the mating surface defines a concave portion corresponding to said cutout in said vertical direction.

* * * * *